United States Patent
Kirkpatrick

(10) Patent No.: US 7,359,868 B2
(45) Date of Patent: Apr. 15, 2008

(54) METHOD AND SYSTEM TO PROCESS REMOTE ORDERS

(75) Inventor: Mark A. Kirkpatrick, Conyer, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 450 days.

(21) Appl. No.: 10/015,703

(22) Filed: Dec. 17, 2001

(65) Prior Publication Data

US 2005/0086116 A1    Apr. 21, 2005

(51) Int. Cl.
G06Q 20/00 (2006.01)

(52) U.S. Cl. .......................... 705/16; 705/26

(58) Field of Classification Search .................. 705/26, 705/16
See application file for complete search history.

(56) References Cited

U.S. PATENT DOCUMENTS

| | | | |
|---|---|---|---|
| 5,524,081 A * | 6/1996 | Paul | 701/300 |
| 5,797,809 A * | 8/1998 | Hyuga | 473/407 |
| 5,845,263 A | 12/1998 | Camaisa et al. | |
| 5,850,214 A * | 12/1998 | McNally et al. | 345/173 |
| 6,026,375 A * | 2/2000 | Hall et al. | 705/26 |
| 6,125,388 A | 9/2000 | Reisman | |
| 6,169,938 B1 | 1/2001 | Hartsell, Jr. | |
| 6,237,647 B1 * | 5/2001 | Pong et al. | 141/94 |
| 6,263,316 B1 | 7/2001 | Khan et al. | |
| 6,553,348 B1 * | 4/2003 | Hashimoto | 705/16 |
| 6,615,186 B1 * | 9/2003 | Kolls | 705/26 |
| 6,676,522 B2 * | 1/2004 | Rowe et al. | 463/42 |
| 6,754,484 B1 * | 6/2004 | Hiltunen et al. | 455/412.1 |
| 6,859,215 B1 * | 2/2005 | Brown et al. | 715/811 |
| 6,989,763 B2 * | 1/2006 | Wall et al. | 340/825.69 |
| 6,996,468 B2 * | 2/2006 | Kohno et al. | 701/200 |
| 7,006,242 B2 * | 2/2006 | Smith et al. | 358/1.15 |
| 7,010,635 B1 * | 3/2006 | Phillips et al. | 710/305 |
| 7,155,210 B2 * | 12/2006 | Benson | 455/414.2 |
| 2002/0143655 A1 * | 10/2002 | Elston et al. | 705/26 |

OTHER PUBLICATIONS

Cohn, Michael, "Personal Networks", Internet World, 7, 12, 28, Jun. 15, 2001.*

PCT/US02/39858 PCT International Search Report, Bell South Intellectual Property Corporation.

* cited by examiner

Primary Examiner—Michael Cuff
(74) Attorney, Agent, or Firm—Withers & Keys, LLC

(57) ABSTRACT

A method and system for processing a remote order is described that allows a customer to remotely send a signal to a business. The signal contains the order information for the customer and what the customer wants from the business. Thus, this system allows the business to process such an order before the customer arrives at the business, preventing idle time by the customer at the business while the order is being processed.

29 Claims, 2 Drawing Sheets

METHOD AND SYSTEM TO PROCESS REMOTE ORDERS

BACKGROUND

1. Field of the Invention

The present invention relates to a method and system for processing orders remotely through use of a receiver that collects information from nearby transmitters.

2. Background of the Invention

Time has become an increasingly precious commodity in today's society. Thus, businesses continually devise time-saving processes to decrease customer idle time during service. While decreasing idle time, customers may spend additional time shopping or other activities that promote more business. Furthermore, businesses that have increased their efficiency by decreasing idle time tend to attract more customers who are attracted by the efficiency of such businesses.

One such process that has increased in many types of businesses because of its timesaving nature for customers is the drive-through or drive up window businesses. Typical examples of such businesses include fast food restaurants, laundry centers, dry-cleaning shops, pharmaceutical prescription drug stores, liquor stores, or the like. However, even with such businesses, customers waste considerable time waiting in drive-up window lines to place their orders, then wait in queue to get their orders and/or receive their products.

The resulting wait in drive-through lines often wastes fuel and time. For example, sometimes it may be quicker to park a vehicle and go inside a fast food restaurant to order and receive food than it is to wait in the drive-through line. Thus, it is desirable to provide a method and system to improve the efficiency of order-taking thereby preventing customer idle time waiting for their order to be processed.

SUMMARY OF THE INVENTION

The present invention is a method and system for receiving remote orders from customers having transmitters. Customers may place orders directly to the business's order processing system while the customer is on his way to the business. The order then may be processed while the customer is still on his way to the business or while parking a vehicle. This will decrease the time the customer spends at the business and increase the throughput of the business.

As used herein and throughout this disclosure, "transmitter" is defined as an electronic device that sends signals remotely. Preferably, the transmitter also receives signals. The transmitter further has a screen or other display that allows a user to choose desired items on a screen menu. A user can devise an order by using an indicating instrument and pointing to various items. Such an indicating instrument could include, for example, a stylus, a pointer, keyboard, mouse-control, or other similar means. Alternatively, a user also can write out an order on the screen by hand, such as through the stylus. Also, optionally, the screen can be touch-sensitive so a user can just touch on an item displayed on the screen to select the item for the order.

The transmitter further is capable of receiving signals from a receiver that sends signals in a localized area. Thus, the transmitter receives such a signal when the transmitter is within a broadcast area of the receiver. The receiver is electrically connected to a business that is using the receiver to collect remote orders placed through transmitters by customers. The receiver can indicate to the customer through signals sent via the receiver that the customer is within the broadcast range of the business, thereby inducing the customer to conduct a transaction with the business. Additionally, the business also may transmit its most current menu of items, services or specials to potential customers via a signal to transmitters in its broadcast area.

The transmitter, as defined throughout this disclosure and the claims, is not intended for direct verbal communication between a customer and a business. The transmitter merely relays a signal containing order information from a customer to a business's localized receiver that detects the signal and further processes the signal through a processor to obtain the original order. The business then follows and prepares the order so that the customer may have the order ready when the customer arrives at the business.

An exemplary embodiment of the present invention is a method of sending a remote order by a customer to a business. The method includes creating a remote order on a transmitter for a product or a service, and transmitting the order via a signal sent by the transmitter, wherein the signal is within the receiving area of and detectable by a receiver in communication with the business, thereby allowing the business to receive and transform the signal back to the original order.

Another exemplary implementation of the present invention is a method of processing a remote order transmitted by a customer. The method includes detecting a remote signal transmitted by a transmitter, the signal containing the order by the customer, translating the signal to obtain the order, and performing a task according to the order.

Another exemplary embodiment of the present invention is a system for processing a remote order. The system includes a transmitter for transmitting a signal containing an original order created by a customer, a receiver for receiving the signal from the transmitter when the signal is within a receiving area, a translator for translating the signal to a translated order, the signal also containing an identifying code, and a reading device to allow an employee of the business to read the translated order and identifying code, thereby processing the original order.

Yet another exemplary embodiment of the present invention is a system for processing a remote order. The system includes means for transmitting a signal containing an original order created by a customer, means for receiving the signal from the transmitter when the signal is within a receiving area, means for translating the signal to a translated order, the signal also containing an identifying code, and means for reading to allow an employee of the business to read the translated order and identifying code, thereby processing the original order.

DETAILED DESCRIPTION OF PREFERRED EMBODIMENTS

An exemplary method and system of the present invention includes a receiver that detects and processes remote signals from transmitters within a broadcast range of the receiver.

The transmitters allow customers to transmit their orders to businesses that have such receivers, thereby promoting efficient use of time for the customer by reducing idle time between placing an order and receiving the order. Preferably, by the time the customer has reached the business, the business has already processed the order and is in position to deliver the order to the customer.

As a non-limiting example, a customer within a certain limited vicinity of a restaurant may place the order remotely through a transmitter, and the restaurant receives the order through its receiver and processes the order. When the customer arrives at the restaurant, the order is ready and available to be picked up by any of the methods described above. The customer may pay at the time his order is received, or be charged according to a pre-determined payment arrangement. Preferably, the receiver would have an identification code for the particular transmitter that has sent information, thereby allowing easy identification of a particular customer's orders or purchase history.

Figure 1:
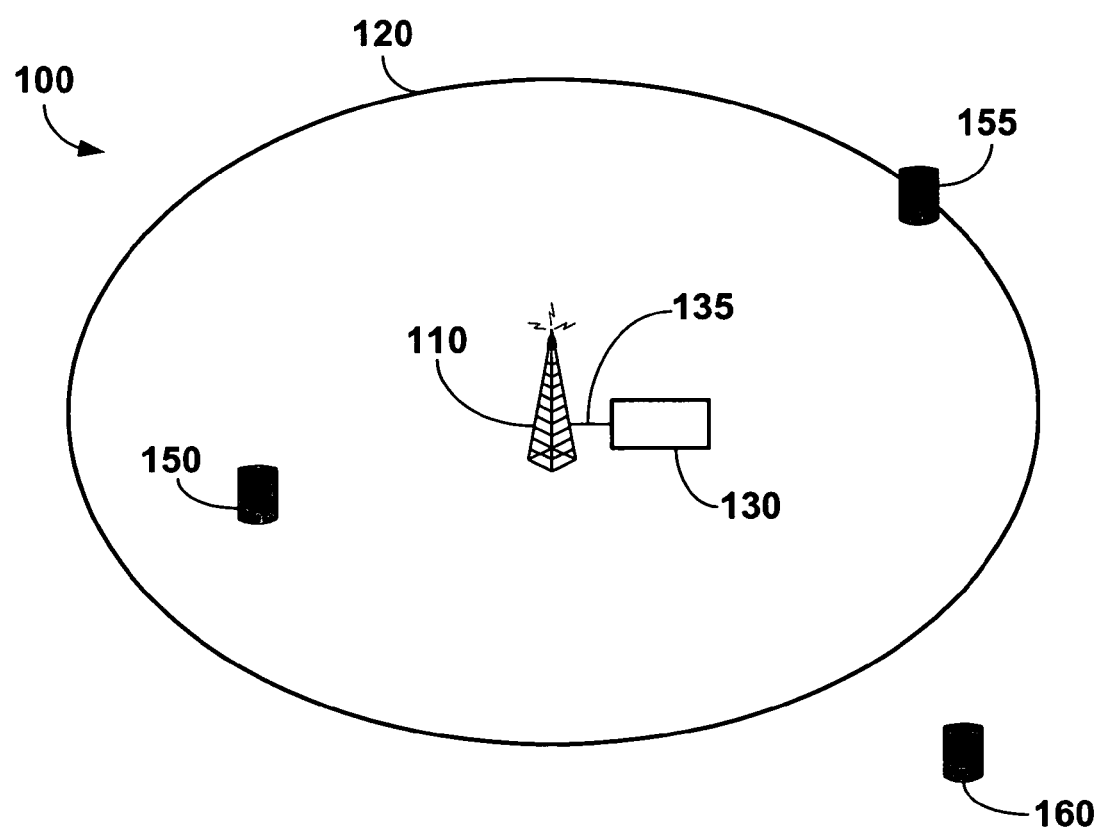
FIG. 1 shows an exemplary embodiment of the present invention showing a signal receiver receiving orders from transmitters at various distances form the tower.

FIG. 1 show s a exemplary embodiment of the present invention as a system 100 for processing remote orders. A receiver 110 includes a receiving means for receiving signals from airwaves. The receiving means may be, for example, a radio tower, a satellite dish or the like. The receiver 110 may have a limited range, being able to detect, receive, or accept signals from a receiving area 120. Such a receiving area 120 may be created by the limitations in the strength range for the receiver 110 detecting and receiving signal. Alternatively, the area 120 may be pre-set to limit the area from which the receiver 110 may detect or process signals.

A reason for limiting the area 120 for receiving signals would be, for example, for the business 130 to ensure that the customer is close enough to be able to pick up an order relatively quickly. As a non-limiting example, a fast food restaurant may prefer that its customers that use a remote ordering system be within a two-mile radius of the restaurant to ensure that the food is still hot when the customer arrives at the restaurant to retrieve the food.

The receiver 110 detects and receives signals from remote transmitters 150, 155 and 160. Such transmitters 150, 155 and 160 may be part of or incorporated into existing electronic devices that are primarily used for other purposes. Such existing devices include, for example, personal data assistants ("PDA"), cellular telephones that have PDA-style screens, remote-Internet-access electronics, two-way pagers, global positioning system devices ("GPS") which have keyboards and screens, or the like. All such devices have other uses other than sending remote orders.

Alternatively, the transmitters 150, 155 and 160 may be stand-alone devices that are primarily used for transmitting orders to receivers 110. Stand-alone transmitters may be provided by businesses themselves that utilize such a system 100 and may be designed to send signals only at designated wavelengths that are specific to the business. Optionally, the stand-alone transmitters may be provided by corporate alliances and therefore usable at numerous establishments, some of these establishments being competitors in the same line of business. The transmitters 150, 155 and 160 may have a screen with a menu of items listed thereon for a customer to place an order. For example, a stylus may be used to select desired items on a screen for a particular order. Alternatively, transmitters 150, 155 and 160 may have a keyboard to allow a customer to type out a list of desired items or instructions to be relayed to the business 130. Optionally, a voice-recognition software may be implemented into the transmitters 150, 155 and 160 to take verbal messages, transcribe them into text, and forward them as signals to a nearby receiver 110 for processing.

Whether the transmitters 150, 155 and 160 are part of an existing system having other purposes or are stand-alone devices with no other function, each transmitter should preferably have an alphanumeric code that serves as an identifier to distinguish it from others. When each transmitter 150, 155 and 160 is distinguishable from another, the business 130 can identify which customer is signaling in an order. Optionally, the customer may type in an additional code that identifies the customer to the business 130, which should verify the code when the customer is picking up his order.

Furthermore, transmitters 150, 155 and 160 may be integrated into a platform, such as a panel of a vehicle. For example, such transmitters may be offered as options on vehicle dashboards alongside or as additional features of GPS systems. In such a case, a customer typically would not be able to remove such a transmitter from the vehicle under normal conditions.

Alternatively, transmitters 150, 155 and 160 may be portable devices, similar to or integrated into other portable electronic devices, such as, for example, a PDA. In this case, such transmitters may be easily transported from one place to another without the constraint of the transmitter having been integrated into a permanent platform, like that of a vehicle described above. Portable or stand-alone transmitters could be transferable from one vehicle to another. Alternatively, such transmitters could be used without a vehicle, such as, for example, during driving of a motorcycle, riding a bicycle, walking, hiking, or the like.

Transmitters 150, 155 and 160 may be at various distances from the receiver 110 at any point in time. For example, transmitter 150 may relay information, such as an order, to a receiver 110 when the transmitter 150 is within the receiving area 120 of the receiver 110. Transmitter 160, which is outside of the receiving area 120, may not be able to transmit any signals to the receiver 110. As transmitter 155 enters the receiving area 120, its signal is detected and processed by the receiver 110. Conversely, as transmitter 150 leaves the receiving area 120, any signal emanating from the transmitter may no longer be detectable by the receiver 110. The receiving area 120 may not have definite or strict boundaries because it may be affected by external factors, such as power of receiver 110, interference from nearby buildings and structures, electromagnetic waves, or the like.

Although labeled and described as a "receiver", receiver 110 is not limited only to receiving signals from transmitters 150, 155 and 160. Receiver 110 also may transmit signals to transmitters 150, 155 and 160. Likewise, although labeled as "transmitters", transmitters 150, 155 and 160 are not limited only to transmitting signals to receiver 110, and further also may receive such signals. This dual capability of receiving and transmitting signals of information by both the receiver 110 and the transmitters 150, 155 and 160 allows interactive communication between customers carrying such transmitters 150, 155 and 160 and a business 130 utilizing such a system 100.

As a non-limiting example, business 130 may desire to notify its customers that are within the receiving area 120 that the business is having a special sale. Thus, customers that are within the receiving area 120 will receive such signals from the receiver 110 transmitted to and detected by their transmitters 150, 155 and 160, thereby notifying them of the sales by the business 130.

As another non-limiting example, business 130 may want to respond to a customer who has already transmitted in an order through the transmitter 150 that the entire order or part of the order is not ready or cannot be processed. Business 130, therefore, may reply to the customer order by sending a signal through the receiver 110 that will be received by the specific customer's transmitter 150. This interaction between the business 130 and the specific customer through the specific transmitter 150 prevents the customer from wasting time traveling to the business 130 when an order cannot be completed.

Signals detected by the receiver 110 are transmitted to the business 130 through electrical connector 135. Electrical connector 135 may be, for example, standard electrical cables, and may connect to the business 130 network via, for example, standard Ethernet connections.

Figure 2:
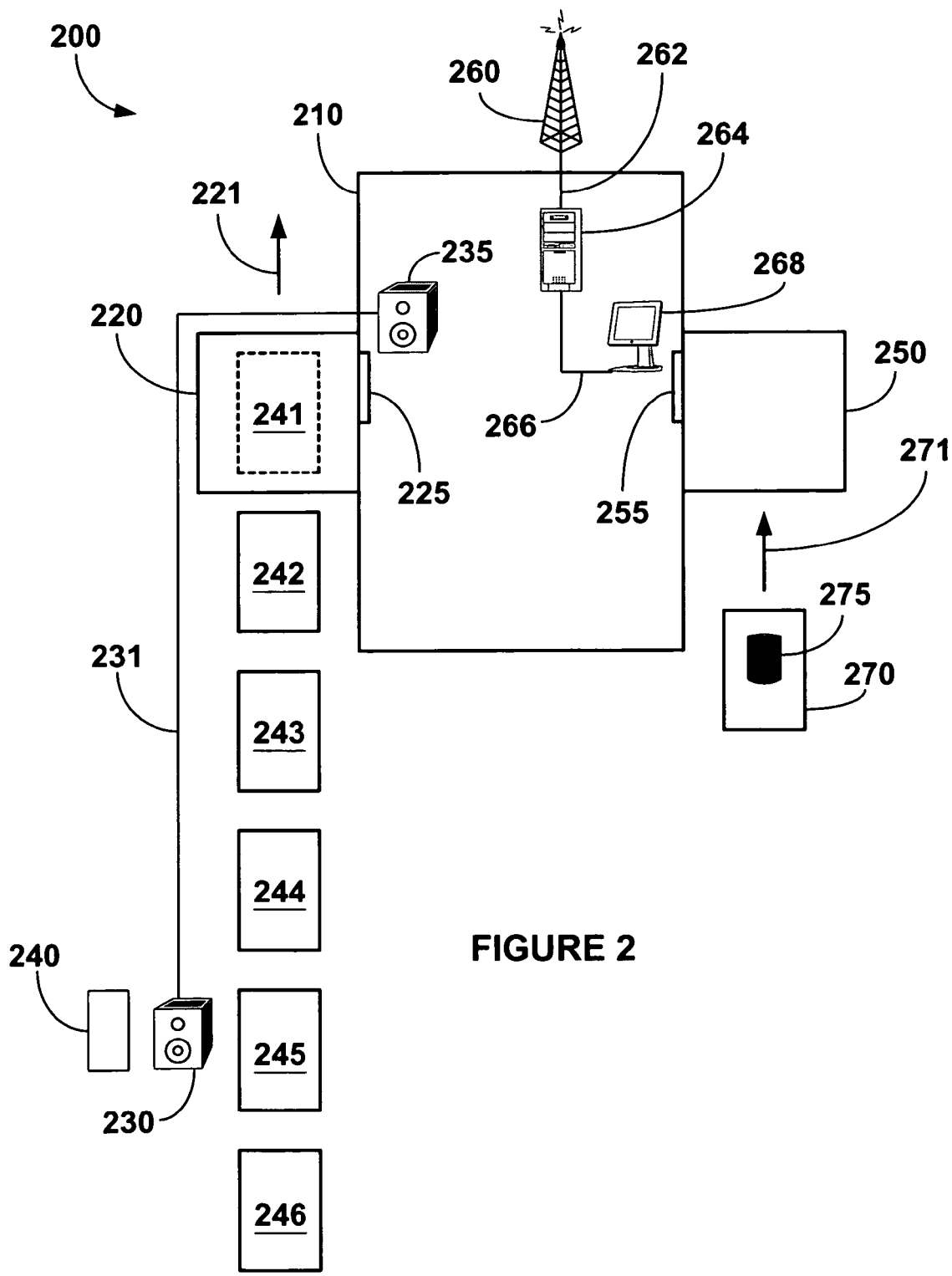
FIG. 2 shows an exemplary embodiment of the present invention showing a business having such an exemplary embodiment of the system of the present invention, and a conventional drive-through system, for comparison.

Another exemplary embodiment of the present invention is shown on the right side of the business 210 in FIG. 2. The business 210 shown in this figure has both a conventional drive-through system and a system for processing remote orders, as shown in an exemplary embodiment of this invention. The business 210 has a conventional system and method for processing drive-through customer orders on the left side of the business 210. For comparison, the same business 210 has a system and method for processing remote orders according to an exemplary embodiment of the invention, as shown on the right side of the business 210.

In a conventional drive-through system, a customer, who may be in a vehicle 245, typically may review a menu 240 of items or services provided by the business 210. The customer then may place an order through an interactive communication device 230, such as a speaker, at a location slightly remote from the business 210. Such a remote location may be, for example, a part of the parking lot of the business 210. The speaker 230 typically is electrically connected via standard electrical connection 231, such as electrical cables, to another corresponding interactive communication device 235, such as a speaker, located inside the business 210. An employee of the business 210 may converse with the customer through the speaker 235 and process the customer's order.

After placing an order, the customer typically then awaits in a line of vehicles, for example, vehicles 241, 242, 243 and 244, which are all ahead of vehicle 245. The customer in vehicle 246 has to wait even longer because he has to place his order at speaker 230 and menu 240 after the line of vehicles 241, 242, 243, 24 and 245 have all progressed forward in the direction of arrow 221. Customers in vehicles 242, 243 and 244 have already placed their orders and are waiting their turn to receive their items at a conventional receiving port 220.

Conventional receiving port 220 typically is covered by a canopy or other cover to protect the items being transferred from the business 210 to the customer in vehicle 241 from being affected by natural elements, such as rain. An employee of the business 210 typically processes the orders and transfers the customer-ordered items from the U business 210 to the customer in vehicle 241 through window 225. The customer also may pay for the items or service that he is receiving from the business 210 through window 225.

Although the conventional system used to process customer drive-through orders, as shown on the left side of the business 210 in FIG. 2, is relatively simple and orderly, such a system has numerous drawbacks and limitations. For example, customers, such as those in vehicles 241 through 246, typically have to wait in line for extended periods of time while their orders are processed by the business 210 in sequential order. Furthermore, the relatively short notice to the business 210 of the desired order placed at speaker 230 results in a natural "order processing" delay that is required to put together the items of the order and prepare the customer to purchase the order when the customer arrives at window 225.

Such a delay is exasperated by customers who order "off the menu", requiring additional time to process the order. For example, if the order of vehicle 241 is delayed because everyone in that vehicle ordered their food cooked in a particular non-standard manner, then the subsequent delay in processing the order will tend to increase the line of vehicles beyond those already in queue. Furthermore, such delays are usually cumulative, whereas if more than one vehicle in line, such as for example, vehicles 241, 242 and 243, order with special instructions, all vehicles in line are affected by the increased cumulative delay resulting from each delay caused by each vehicle.

In contrast, the exemplary embodiment of a system and process shown on the right side of the business 210 in FIG. 2 decreases the order processing delay time discussed above. Thus, customers spend less time standing idle in a line because their orders have been placed before the customer has arrived at business 210, and would preferably be ready for pick up when the customer actually arrives at business 210.

A customer having a transmitter 275 may place an order therethrough by means described above and wait until the transmitter 275 is within range of a receiver 260 connected to the store 210. Alternatively, when the transmitter 275 detects a signal, including, for example, a recent or updated menu, from the receiver 260 indicating that the transmitter 275 is within the range of the receiver 260, the customer may then place an order. The customer and transmitter 275 may both be, for example, in a vehicle 270, as discussed above.

When the customer places an order through the transmitter 275, a signal is transmitted that may be detected by the receiver 260, which may have the same properties as receiver 110 in FIG. 1. Receiver 260 forwards the detected signal through an electrical connector 262, such as, for example, an electrical cable, to a processor 264. This processor 264 may translate and transform the signal into a readable format, such as textual or graphical output, which may be transmitted through electrical connector 266 and displayed on screen 268. Additionally, processor 264 may recognize transmitter 275, which sent the order signal, in an inventory database of transmitter identifier codes, thereby automatically identifying a particular customer and/or vehicle.

Optionally, the customer may have a pre-determined arrangement with the business 210 or related third party, such as, for example, a credit card company, to automatically charge all remote orders to the customer's account. In this latter situation, the customer only may have to sign a verification form upon receiving his order, thereby decreasing even more time spent at the business 210. Also, optionally, the customer may enter a credit card number to charge the order at the time of ordering to facilitate the transaction upon reaching the window 255. By the time the customer reaches the window 255, his order and his credit card receipt would preferably be ready.

As the vehicle 270 transporting the customer and the transmitter 275 arrive at the business 210, they may drive right to a remote receiving port 250, for example, in the direction indicated by the arrow 271. Upon reaching the window 255 in vehicle 270, the customer's order preferably should have been processed and is ready for immediate pick up by the customer. Alternatively, the business 210 may provide a special parking area for vehicles that have placed remote orders. Such vehicles would park in the parking lot and await an employee of the business 210 to come to the vehicle with their order. The vehicle could be recognized because of information in the processor 264 that associates the transmitter 275 with such a make and mode of vehicle. Alternatively, and particularly for portable transmitters, the customer may indicate his make or model of vehicle upon placing the order, thereby facilitating business 210 employee's association of specific orders with specific vehicles.

One of the advantages of the method and system of this invention is the minimization of time that a customer has to spend at the store. Thus, the method and system of the present invention may be applied to any business that desires to save time for its customers by eliminating time that the customer has to spend at the business for various reasons, for example, finding products, awaiting service, or the like. Exemplary businesses that would benefit from the present invention include, but are not limited to, restaurants, including those designated as "fast food restaurants", washing and dry-cleaning establishments, drug stores, grocery stores, convenient stores, discount warehouses, liquor stores, or the like.

Because less time has to be spent "shopping", more customers may be able to utilize businesses that they previously avoided because of the requisite time required for such activities. For example, a customer that does not have an hour to spend for grocery shopping may spend a few minutes placing his order remotely to a grocery store having a receiver, then drive up to the store, have his order placed into his vehicle, pay and leave. He would save the time required to find parking, walk through the many isles in the grocery store, locate his desired items, then wait in a check out line to purchase the items, transport the items back to her car, load the car, and finally leave. With the present invention, the same customer's only time requirement would be to place an order and then wait as the items are placed into his vehicle. He may pay for the items while the items are being placed into his vehicle by employees of the business who have brought the items out into a loading zone. Optionally, he may pre-arrange a payment plan with the grocery store to have his orders automatically billed to a particular account, such as a credit card or store card, thereby saving the time required to pay for the purchase.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What claim is:

1. A method of sending a remote order by a customer to a business, the method comprising:
    creating a remote order on a transmitter for a product or a service;
    transmitting the order via a signal sent by the transmitter when the transmitter is within a receiving area of and detectable by a receiver in communication with the business, the signal comprising at least one designated wavelength specific to the business, the receiving area comprising a pre-set limited area from which the receiver detects the signal sent by the transmitter and forwards the detected signal to the business when the transmitter is within the pre-set limited area, the pre-set limited area comprising a predetermined radius within a signal strength range associated with the receiver for detecting and receiving signals, thereby allowing the business to receive and transform the signal back to the original order,
    wherein the transmitter comprises a receiving function and the receiver comprises a transmitting function for sending a signal to the transmitter, the signal comprising a sale notification to the customer from the business, and
    wherein the order comprises information associated by the receiver with a make and model of vehicle from which the order is transmitted, and
    wherein an employee of the business delivers the order to the vehicle by recognizing that the vehicle matches the make and model of the vehicle from which the order was placed, and
    wherein the receiver is capable of transmitting a reply to the transmitter reporting a status of the order, and
    wherein a menu signal sent by the receiver prior to receiving the signal from the transmitter includes a menu of products.

2. The method of claim 1, wherein the transmitter is a personal data assistant.

3. The method of claim 1, wherein the transmitter is integrated into a platform, the platform comprising a vehicle panel.

4. The method of claim 1, wherein the transmitter has an identifying code, the code also being included in the signal.

5. The method of claim 4, wherein the business can identify the customer according to the code.

6. A method of processing a remote order transmitted by a customer, the method comprising:
    receiving, at a receiver in a receiving, a first remote signal transmitted by a transmitter, the signal containing the order by the customer, the receiving area comprising a preset limited area from which the receiver detects the signal transmitted by the transmitter, the preset limited area comprising predetermined radius within a signal strength range associated with the receiver for detecting and receiving signals;
    translating the signal to obtain the order; and
    performing a task according to the order, wherein the order comprises information associated by the receiver with a make and model of vehicle from which the order is transmitted, wherein the order is delivered to the vehicle by an employee recognizing that the vehicle matches the make and model of vehicle from which the order was placed, and wherein the receiver is capable of transmitting a reply to the transmitter reporting a status of the order transmitting a sale notification to a customer associated with the transmitter, and wherein a menu signal sent by the receiver prior to receiving the signal from the transmitter includes a menu of products.

7. The method of claim 6, wherein the transmitter is a personal data assistant.

8. The method of claim 6, wherein the transmitter is a device that has no other substantial use other than to submit such a signal.

9. The method of claim 6, wherein the transmitter's primary function is to submit such a signal.

10. The method of claim 9, wherein the business can identify the customer according to the code.

11. The method of claim 10, wherein the step of performing the task occurs before the customer arrives at the business.

12. The method of claim 11, wherein the task includes preparing a food order for the customer to pick up.

13. A system for processing a remote order, the system comprising:
  a transmitter for transmitting a first signal containing an original order created by a customer;
  a receiver for receiving the first signal from the transmitter when the signal is within a receiving area, the signal comprising at least one designated wavelength specific to a business, the receiving area comprising a pre-set limited area from which the receiver detects the signal sent by the transmitter and forwards the detected signal to the business when the transmitter is within the pre-set limited area, the pre-set limited area comprising a predetermined radius within a signal strength range associated with the receiver for detecting and receiving signals, wherein the order comprises information associated by the receiver with a make and model of vehicle from which the order is transmitted, wherein the order is delivered to the vehicle by an employee recognizing that the vehicle matches the make and model of vehicle from which the order was placed, and wherein the receiver is capable of transmitting a reply to the transmitter reporting a status of the order and transmitting a sale notification to a customer associated with the transmitter, and wherein a menu signal sent by the receiver prior to receiving the signal from the transmitter includes a menu of products;
  a translator for translating the signal to a translated order, the signal also containing an identifying code; and
  a reading device to allow an employee of the business to read the translated order and identifying code, thereby processing the original order.

14. The system of claim 13, wherein the identifying code is unique to the transmitter.

15. The system of claim 13, wherein the identifying code is unique to the customer.

16. The system of claim 13, wherein the transmitter is a personal data assistant.

17. The system of claim 13, wherein the transmitter's primary function is to s,submit such a signal.

18. The system of claim 13, wherein the transmitter is located inside of a vehicle and integrated into a vehicle panel.

19. The system of claim 13, wherein the translator also contains a database of identifying codes that correlate a transmitter with a customer.

20. The system of claim 13, wherein the translator assigns a cost to the customer associated with the processing of the order.

21. The system of claim 20, wherein the costs are automatically charged to an account of the customer.

22. A system for processing a remote order, the system comprising:
  means for transmitting a signal containing an original order created by a customer;
  means for receiving the signal from the means for transmitting when the signal is within a receiving area, the signal comprising at least one designated wavelength specific to a business, the receiving area comprising a pre-set limited area from which the receiver detects the signal sent by the means for transmitting and forwards the detected signal to the business when the means for transmitting is within the pre-set limited area, the pre-set limited area comprising predetermined radius within a signal strength range associated with the means for receiving for detecting and receiving signals, wherein a menu signal sent by the means for receiving the signal prior to receiving the signal from the means for transmitting the signal includes a menu of products;
  means for translating the signal to a translated order, the signal also containing an identifying code; and
  means for reading to allow an employee of the business to read the translated order and identifying code, thereby processing the original order, and
  wherein the order comprises information associated by the means for receiving with a make and model of vehicle from which the order is transmitted, wherein the employee delivers the order to the vehicle by recognizing that the vehicle matches the make and model of vehicle from which the order is transmitted, and wherein the means for receiving is capable of transmitting a reply to the means for transmitting reporting a status of the order and transmitting a sale notification to a customer associated with the means for transmitting.

23. The system of claim 22, wherein the identifying code is unique to the transmitter.

24. The system of claim 22, wherein the identifying code is unique to the customer.

25. The system of claim 22, wherein the means for transmitting is a personal data assistant.

26. The system of claim 22, wherein the means for transmitting is located inside of a vehicle and integrated into a vehicle panel.

27. The system of claim 22, wherein the means for translating also contains a database of identifying codes that correlate a means for transmitting with a customer.

28. The system of claim 22, wherein the means for translating assigns a cost to the customer associated with the processing of the order.

29. The system of claim 28, wherein the costs are automatically charged to an account of the customer.

* * * * *